United States Patent Office 3,342,627
Patented Sept. 19, 1967

3,342,627
METHOD FOR IMPREGNATING GRAPHITE BODIES AND THE ARTICLE PRODUCED THEREFROM
Ralph R. Paxton and George I. Beyer, St. Marys, Pa., assignors to Pure Carbon Company, Inc., St. Marys, Pa., a corporation of Pennsylvania
No Drawing. Filed May 5, 1964, Ser. No. 365,152
23 Claims. (Cl. 117—113)

This invention relates to the treatment of shaped carbon articles. More particularly, the present invention relates to a method or process for improving the resistance to oxidation of graphite articles and to the treated graphite articles per se.

Synthetic graphite can be manufactured by subjecting amorphous carbon to a very high temperature by means of an electric furnace. In practice, calcined petroleum coke, lamp black, furnace black, channel black, natural graphite, artificial graphite and so forth and mixtures there of are mixed, usually while hot, with coal tar pitch, petroleum pitch, sugar, molasses and so forth until an intimate mixture is obtained. If a phenol-formaldehyde type resin is used as a binder, the materials should be mixed cold. The mix may be heated and then extruded or pressed; alternatively, it may be cooled and pulverized and then cold pressed at pressures ranging upwards to 40,000 lbs./sq.in. After forming, the articles are baked in an oven in a protective atmosphere at 600 to 1200° C. for a period of time sufficient to carbonize the binder. The carbon is then converted to artificial or Acheson graphite by heating in an electric furnace protected from oxidation in a protective atmosphere such as in an atmosphere of argon, etc. or surrounded by a mixture of carbon and sand at a temperature of from about 2200 to 3000° C. for from 1 hour to several days depending on the degree of crystallinity desired and the size and amount of carbon articles being treated.

Even though relatively pure materials are used in making the carbon bodies to be graphitized, they still contain about 0.2 to 3% by weight of impurities as ash. Graphitizing, due to the temperatures employed, vaporizes much of this ash so that the resulting shaped graphite articles contain only about 0.05 to 0.2% ash which on spectographic analysis shows Fe, K, Na, Si, B and other elements to be present. For example, the Fe may be present as iron carbide which is a potent catalyst for the carbon-oxygen reaction. This ash or one or more components thereof while only present in a very minor amount is believed to accelerate the oxidation of the graphite. While treatment of the graphite articles at 2000° C. in HCl or HF gas can reduce or eliminate this ash, the process involved is expensive and difficult to control. Also, the graphite articles can be treated with various salt solutions, the $H_2O$ driven off, and the treated graphite baked at temperatures of from 250 to 600° C. The introduction of such salts by solution techniques contributes more to the ash problem although some improvement in oxidation resistance can be observed. Phosphoric acid or $P_2O_5$ may be used to treat carbon. These, however, require sealed containers to maintain the vapors in contact with the graphite being treated at elevated temperatures. Owing to the corrosive nature of the $P_2O_5$ vapors generated and to the excessive pressures developed, this mode of treatment has not proven satisfactory. Moreover, carbon or graphite articles can be impregnated with molten $P_2O_5$ to get a 5 to 6% increase in weight. However, as soon as the impregnated article is employed at elevated temperatures, dense fumes of $P_2O_5$ are given off which are corrosive and attack adjacent equipment.

Accordingly, it is a primary object of the present invention to avoid the difficulties alluded to above and to provide an easy method for increasing the resistance of shaped graphite articles to oxidation.

A further object is to provide a graphite article having improved resistance to oxidation.

Further objects are to provide an improved ungraphitized carbon body and method of making it.

These and other objects and advantages of the present invention will become more apparent to those skilled in the art from the following detailed description and examples.

According to the present invention, it has been found that the oxidation resistance of shaped graphitized or graphite articles can be unexpectedly improved by impregnating the articles with an inorganic phosphate salt or phosphate ceramic melt to fill up a substantial and preferably a very substantial amount of the open cells of the article. The coefficient of friction and wear of shaped carbon articles, ungraphitized, is improved by the method of this invention.

Carbon, graphite or graphitized articles to be treated according to the method of the present invention can be in the shape of rods, tubes, bricks, plates, cubes, etc. or can be previously molded and/or machined in the form of brushes, electrodes, contacts, bearings, joint seals, seal rings (also additionally as liquid oxygen seals), pistons, crucibles, valve seats, jigs and fixtures for use in high temperature furnaces and so forth. They usually contain no more than about 0.2% ash although in the case of non-graphitized manufactured carbon the ash can be as high as 8%. While this invention has been described with particular reference to the treatment of shaped graphite articles, it will be appreciated that in its broader concept the present invention is applicable to all porous shaped carbon articles graphitized or non-graphitized. Manufactured carbon or graphite articles are generally porous and can contain from about 5 to 30% by volume porosity. This can be determined by impregnating the articles with water at 4000–5000 p.s.i. and measuring the gain in weight. While small amounts of the phosphate salt melt will give some improvement in oxidation resistance, it has been found that to make a very useful carbon or graphite it is necessary to fill up at least 55% of the open cells or voids with the phosphate melt. By open cells is means those cells which have some communication will each other and ultimately with the surface of the article including any cells or pores which may open during treatment in the melt due to the temperatures and pressures used and so forth. Preferably from about 55 to 85% of the open cells of the carbon or graphitized carbon articles are filled with the phosphate melt or ceramic.

Any of the various inorganic meltable phosphate salts can be used such as the inorganic ortho, pyro and meta phosphate salts. Examples of useful phosphate salts are $AlPO_4$, $Al_2(HPO_4)$, $Al(H_2PO_4)_3$, $BPO_4$, $H_3BPO_4$, $LiH_2PO_4$, $Li_3PO_4$, $BiPO_4$, $Na_2HPO_4$, $NaH_2PO_4$, $Na_3PO_4$, $MgHPO_4$, $Ag_3PO_4$, $Mg(H_2PO_4)_2$, $MgH_4(PO_4)_2 \cdot 2H_2O$, $Mg(PO_3)_2$, $Mg_3(PO_4)_2$, $Cd_3(PO_4)_2$, $Cu_3(PO_4)_2$, $Ag_4P_2O_7$, $H_3[Fe(PO_4)_2]$, $Mg(H_2PO_4) \cdot 2H_2O$, $Pb(H_2PO_4)_2$, $NH_4MgPO_4 \cdot 6H_2O$ $BaPO_3$, $KNa(PO_3)_2$, $CaHPO_4$, $Ca(H_2PO_4)$, $Ca_2P_2O_7$, $Ca(PO_3)_2$, $NaCa(PO_3)_3$, $Ba(PO_4)_2$, $Na_2[Na_4(PO_3)_6]$, $K_4P_2O_7$, $Mg_2P_2O_7$, $Zn(H_2PO_4)_2$, $Zn(PO_3)_2$, $Zn_3P_2O_8$, $3PB_3(PO_4)_2 \cdot Pb(OH)_2$, $ZnHPO_4 \cdot 2H_2O$, $Th_3(PO_4)_4$, and other metallic phosphates and the like and mixtures thereof. Preferably, the phosphates are used in their anhydrous, dehydrated form or free of water of crystallization. However, anhydrous materials are not necessary since at the usual melt temperatures which are above 100° C. $H_2O$ will be evolved to form $P_2O_5$ and $M_xO_y$ where M is a metal or other cation such as Al, B, Li, Zn, Mg, Ca, Na, etc., $x$ corresponds to the number of atoms of M and $y$ correspond to the number of atoms of oxygen. Also the phosphates preferably should not be too highly alkaline so that they provide metal or metal ions which will vaporize during treatment and possibly inhibit the action of the $P_2O_5$. In the melt the phosphates or mixtures thereof release $H_2O$ and form $M_xO_y \cdot P_2O_5$ where M, O, $x$ and $y$ have the significance as indicated above. The mol ratio of $M_xO_y$ to $P_2O_5$ can vary from about 4:1 to 1:4. Although a molar excess of $M_xO_y$ over $P_2O_5$ tends to inhibit the action of the $P_2O_5$ so that reduced oxidation resistance is observed and possibly reduced penetration, it may be desirable where higher temperatures are to be encountered in use to avoid exudation of the ceramic. Alternatively, higher melting point phosphates or mixtures of phosphates can be used to achieve higher ceramic melting points to avoid exudation at higher temperatures. Moreover, where the article is shielded from the atmosphere or from oxygen, less $P_2O_5$ activity may be required. On the other hand excess $P_2O_5$ may cause serious corrosion or deterioration of adjacent equipment unless the article or the equipment is suitably encased or protected. Moreover, excess $P_2O_5$ increases the solubility of the phosphate or ceramic but may be desired for higher $O_2$ resistance. Preferably for general purposes the $M_xO_y$ to $P_2O$ molar ratio is about 1:1. More preferred are mol ratios of $M_xO_y$ to $P_2O_5$ of from about 0.3:1 to 0.6:1 to obtain high oxidation resistance. Of course where different cations or metals are used because of different phosphates or mixtures of phosphates being employed $M_xO_y$ means the total of such $M_xO_y$ components are clearly shown by the working examples. A very useful graphite is one containing a 1:1 ratio of $M_xO_y$ to $P_2O_5$ where $M_xO_y$ comprises MgO and $Li_2O$ or other mixed metallic oxides in the mol ratio of about 0.2:0.8 to 0.5:0.5. The impregnant as used herein also increases the strength of the impregnated graphite article at room temperature.

To alter the $M_xO_y$ to $P_2O_5$ ratio various phosphates of the same or different cations or metals can be used. Alternatively an organic metal (or cation) phosphate salt can be used such as zinc acetate, lithium acetate, $$(LiC_2H_3O_2 \cdot 2H_2O)$$

etc. or other metallo organic phosphorous salt or compound, care being taken when metallo organics are used. Alternatively, additions of one or more of the phosphoric acids can be used. These materials are used in the amounts to provide the melt as well as the ceramic deposited in the pores of the graphite with the desired ratio of $M_xO_y$ to $P_2O_5$ required by the type of service of the final article.

To reduce the viscosity of the phosphate melt or to increase wetting of the melt for the graphite various inorganic metallic borates and silicates can be added to the melt as diluents etc. They include $$Al_2O_3 \cdot 2H_2O \cdot 2SiO_2$$

$K_2O \cdot Al_2O_3 \cdot 6SiO_2$, $LiB_4O_7 \cdot H_2O$, $LiBO_2$, $3ZnO \cdot 2B_2O_3$, $CaB_4O_7$, $Pb(BO_2)_2 \cdot H_2O$, $PbSiO_3$, $LiSiO_4$, $Mg_3(BO_3)_2$, $Mg(BO_2)_2 \cdot 3H_2O$, $Mn_2SiO_4$, $K_2B_2O_4$, $K_2SiO_3$, $$Ag_2B_4O_7 \cdot 2H_2O$$

$Na_2B_4O_7$, $Na_2Si_2O_5$, $ZnSiO_3$ and the like and mixtures thereof. The borates and silicates are meltable at the temperatures used or will dissolve in the molten phosphate composition. From about ½ to 7 moles of the borate and/or silicate are used per mole of the phosphate compositions or mixtures used to form the melt or forming the melt.

To impregnate the carbon or graphite articles the phosphate or phosphate ceramic is melted in a suitable container, such as a bonded silicon carbide crucible, preferably well above its melitng point. Although melting can be done under inert atmospheres, it is preferably conducted in air. The phosphate or phosphate ceramic is melted until it becomes fluid, usually about 250° C. above its melting point. It must not be too viscous in order to flow properly into the graphite article. On the other hand the temperature should not be too high to cause thermal decomposition of the phosphate ceramic or the melt to be too thin so that it will run out of the carbon body. In general the viscosity of such phosphate composition melt should be similar to a liquid having a viscosity of from about 50 to 1000 centipoises. Melt or fusion temperatures, thus, may range from about 400 to 1500° C. The molten phosphate or phosphate ceramic is then poured over the graphite bodies in a container, such as one of bonded silicon carbide, in an autoclave, to completely cover them. The autoclave is then pressurized with air, nitrogen, or an inert gas if desired to a pressure of about 325 atmospheres for several minutes to force the impregnant into the pores of the graphite. The time and temperature are limited by the cooling rate of the vessel in the autoclave. The autoclave can be heated to avoid this cooling effect. If the autoclave is heated the temperatures can be reduced somewhat with an increase in the time or pressures. Pressures can be as low as 125 atms. up to 500 atms. depending on time, temperature and materials being used. The impregnation should be conducted in a manner to provide a uniform impregnation throughout the body of the grapihte article. If the impregnant does not penetrate the interior of the graphite body or is not uniform throughout the body, good oxidation resistance will not be obtained. Alternatively, the graphite can be placed in a cylinder covered with a suitable amount of the phosphate melt and subjected to ram pressure by a piston to force the molten phosphate composition into the pores of the graphite.

After impregnation the carbon or graphite bodies are removed from the container or autoclave and the excess melt deposited in other containers. The graphite bodies can be allowed to cool in air or nitrogen at 25° C. but preferably are placed in a $H_2O$ wet carbon or graphite mixture until they cool down and the phosphate becomes fused (cooled and/or solid). Also, during this latter step cracked glass or ceramic forms on the outside surfaces of the impregnated graphite article which facilitates cleaning. Finally the impregnated graphite body is cleaned by removing surface ceramic etc. and may be machined to size if desired.

Melt impregnated graphites prepared according to the method of the present invention are approximately 30% stronger than solution impregnated graphites starting with the same base material. Moreover, the voids filled of the graphite increased approximately 5-fold using the melt impregnation method as compared to solution impregnation method. Also, the oxidation resistance of the melt impregnated graphite increased over 10-fold as compared to a solution impregnated graphite. Furthermore, the solution impregnation processes are time consuming. For example, to obtain a graphite having a relative life of 50 hours (air at about 677° C. to 5% loss) using one dip in the solution, it is necessary to carefully heat the impregnated graphite to remove the solvent taking from 4 to 24 hours; next, the solution impregnated graphite is cured at 500° C. for from 2 to 20 hours to set the salt so that it is not too soluble, taking overall from 6 hours to 2 days. On the other hand to obtain a melt impregnated graphite having a relative life of 500 to 7000 hours, the phosphate can be melted in 4 to 5 hours, after which it takes only from 25–30 minutes to impregnate, at most about 6 hours. After melting the phosphate or ceramic, repeated impregnations in 25–30 minutes are possible. Also, melt impregnation requires no after baking step as is required with respect to solution impregnation. Moreover, if solution impregnation is repeated, there is a practical limit as to the amount of impregnation obtainable since as the graphite is repeatedly dipped in the solution, the salt is dissolving into the solution as fast as it is being deposited from the solution.

Another benefit of the melt impregnated ungraphitized and graphitized carbon bodies of this invention is that the process greatly reduces the permeability to gas flow of the carbon body. Permeability reductions to 0.0001 of the original permeability are common. The resultant melt impregnated body has such a low permeability that it can readily be used as a seal component.

It is believed that the results obtained by the method of the present invention are due in some measure to a reduction in the overall surface area of the graphite or graphitized carbon bodies subject to attack by oxygen by filling a substantial amount or substantially all of the pores of the graphite with a phosphate affording a substantial amount of $P_2O_5$ which is also an inhibitor of the carbon-oxygen reaction. The impregnant may also exist as a glass rather than as a crystalline material. Moreover, the treatment of the present invention can act in part by converting the residual ash forming catalytically active metals and carbides in the graphite specimen to non-active phosphates. This treatment may further act in part by chelation or chemisorption of $P_2O_5$ or other oxides of phosphorous onto the active sites of the carbon lattice structure. The product made by this treatment is an oxidation resistant carbon or graphite suitable for use in air, $CO_2$ or other oxidizing gases at elevated temperature. At very high temperatures the rate of corrosion or oxidation of the graphite is largely a function of exposed area and gas velocity. The treated carbons or graphites of the present invention are especially useful for high temperature uses such as in seals, bearings, fixtures, oven casters, conveyors, and controls and in jet engine component bearings, and when they are used at elevated temperatures, they should be used in atmosphere free of, or preferably free of, hydrogen or other reducing gas.

For example, the products of the present process can be used to provide bearings and seals which are operating at temperatures of 260°–760° C. These include kilns, ovens, lehrs, furnaces and their associated conveyors, carts, fans, etc. Also in this class are motors, shafts and engines where frictional heat pushes the seal or bearing temperature above 260° C. Lastly there are jet engines with their seals, bearings and control bushings that operate at high temperatures.

The treated graphites of the present invention also exhibit an improved coefficient of friction and wear rates, and they are stronger and more ductile at 649° C. than at 25° C. They exhibit satisfactory modulus of elasticity, hardness, coefficient of thermal expansion, flow resistance and electrical resistance. The specific heat (75–1200° F. avg., B.t.u./lb. ° F.) of some products varied from 0.32 to 0.31 and their thermal conductivity (B.t.u./hr. ft.$^2$ °F./in., 75–1200 °F., avg.) was about 200. They are compatible with the chlorinated and hydrocarbon solvents as well as some oxygenated solvents, oils and liquid metals up to 260° C.

The following examples will serve to illustrate the invention with more particularity to those skilled in the art:

EXAMPLE 1

| Run No. | Impregnant | Shaped Graphite | | Impregnation | | Hrs. to 5+ Wt. Loss in Air at 677° C. |
|---|---|---|---|---|---|---|
| | | Type | A.D.[a] | Content, percent | Voids Filled,[b] percent | |
| 1-1 | LiH$_2$PO$_4$ solution | GPCBC | 1.87 | 1.70 | 15 | 7.1 |
| 1-2 | ----do---- | GPCBC | 1.84 | 2.10 | 16 | 12.6 |
| 1-3 | LiH$_2$PO$_4$ melt | GPCBC | 1.84 | 9.78 | 85 | 145.2 |
| 1-4 | Control | GPCBC | 1.85 | .0 | 0 | 0.8 |

[a] Apparent Density; GPCBC—Graphitized (calcined) petroleum coke base carbon.
[b] Assumes spec. gr. of LiPO$_3$ is 2.5.

In the impregnations of the graphite samples in Runs 1-1 and 1-2 the LiH$_2$PO$_4$ was put in the graphite's pores using an aqueous solution containing 55 parts solids/100 parts water. After impregnation the water was evaporated and the sample was "cured" at 480° C. to convert the dihydrogen phosphate to metaphosphate. The samples were weighed after curing and content calculated from weight gain.

The impregnation of the graphite in Run 1-3, however, used a melt produced by heating LiH$_2$PO$_4$ to a temperature of 875° C. (At this temperature LiH$_2$PO$_4$ releases water and goes to LiPO$_3$). The graphite was submerged in the melt. The melt with the graphite was then subjected to an air pressure of 325 atmospheres thereby forcing the melt into the small pores of the graphite body. After releasing the pressure, the graphite was removed from the melt, cooled, weighed, and tested for oxidation resistance.

Oxidation resistance of the graphite of Run 1-3 was increased 20-fold when the melt technique was substituted for the solution technique of Runs 1-1 and 1-2. An increase of this magnitude was unexpected.

Another unexpected advantage of this melt impregnation was a large increase in strength of the graphite body.

Apparent density was calculated from dry weight and physical dimensions of the samples.

| Run No. | Material | A.D., gm./cc. | Scleroscope Hardness | Flexural Strength, p.s.i. | |
|---|---|---|---|---|---|
| | | | | Average | Range |
| 1-5 | GPCBC non impreg. control [a] | 1.80–1.83 | 76–86 | 10,947 | 8,980–12,048 |
| 1-6 | GPCBC with LiH$_2$PO$_4$ melt [b] | 1.96–2.07 | 84–93 | 16,325 | 15,390–17,130 |

[a] Range and average for 12 pieces.
[b] Range and average for 9 pieces.

Flexural (or transverse) strength values were obtained with the AIEE/NEMA standard beam procedure at room temperature.

Scleroscope hardness is a measure of the resiliency of the material to a falling diamond tipped hammer. Hardened tool steel has a resiliency of 70–90 on this scale.

Hrs. to 5% loss, air, 677° C. This is the oxidation resistance of the treated sample. The values shown are the hours required to corrode or oxidize away 5% of the weight of the samples when it is suspended in flowing air heated to the temperature shown.

EXAMPLE 2

Increasing $Li_2O$ to $P_2O_5$ ratio increases melting point but reduces effectiveness as an oxidation inhibitor.

| Run No. | Impreg. Mol Ratio | | Shaped Graphite | | Impregnation | | Hrs. to 5% Wt. Loss in Air at 677° C. |
|---|---|---|---|---|---|---|---|
| | $Li_2O$ | $P_2O_5$ | Type | A.D. | Content | Voids Filled, Percent [a] | |
| 2-1 | 1.000 | 1.000 | GPCBC | 1.84 | 9.78 | 85 | 145.2 |
| 2-2 | 1.078 | 1.000 | GPCBC | 1.84 | 8.90 | 75 | 104.0 |
| 2-3 | 1.443 | 1.000 | GPCBC | 1.84 | 7.03 | 60 | 18.8 |
| 2-4 | 1.735 | 1.000 | GPCBC | 1.84 | 6.75 | 55 | 47.8 |
| 2-5 | 1.935 | 1.000 | GPCBC | 1.88 | 5.43 | 55 | 7.0 |
| 2-6 | Control | | GPCBC | 1.85 | 0 | 0 | 0.8 |

[a] Assumes sp. gr. of condensed $Li_2O/P_2O_5$ system=2.5.

All these graphite impregnations used the melt technique described in Example 1, above. Run 2-1 charged $LiH_2PO_4$ to the melter to which was added the graphite. Runs 2-2 to 2-4 started by impregnating the graphites with $LiC_2H_3O_2 \cdot 2H_2O$ (lithium acetate) solutions of various concentrations. The cubes were dried and then fired at 370° C. to convert the lithium acetate to lithium oxide. Weight gain was measured. Then they were impregnated with a $LiPO_3$ melt from $LiHPO_4$ in the manner of Run 2-1. Weight gain from this second, the melt impregnation, was separately measured. From the two weight increments, the molar $Li_2O$ to $P_2O_5$ ratio was calculated.

Run 2-5 impregnation charged a 1:1 ratio of $Li_3PO_4$ and $LiH_2PO_4$ to the melter. This melt was then impregnated into the graphite test cubes.

To get the melting point of the $Li_2O/P_2O_5$ system above 750° C. it is necessary to get the $Li_2O/P_2O_5$ ratio up at least to 1.4. These data show that increasing this ratio also sharply cuts the effectiveness of this system as an oxidation inhibitor. Part of this loss is also apparently due to a poorer job of void filling.

EXAMPLE 3

| Run No. | Impregnant Mol Ratio | | | Shaped Graphite | | Impregnation | | Hrs. to 5% Wt. Loss in Air at 677° C. |
|---|---|---|---|---|---|---|---|---|
| | MgO | $Li_2O$ | $P_2O_5$ | Type | A.D. | Content | Voids Filled Percent [a] | |
| 3-1 | 0 | 1.000 | 1.000 | GPCBC | 1.84 | 9.78 | 85 | 145.2 |
| 3-2 | 0.277 | 0.723 | 1.000 | GPCBC | 1.88 | 6.55 | 69 | 499.0 |
| 3-3 | 0.526 | 0.474 | 1.000 | GPCBC | 1.87 | 5.71 | 55 | [b] 57.7 |
| 3-4 | 0.606 | 0.394 | 1.00 | GPCBC | 1.82 | 9.27 | 70 | 89.6 |

[a] Assumes spec. gr. of $MgO-Li_2O-P_2O_5$ cermic=2.5.
[b] Based on 48.5-hr. test.

In this example magnesia was used to raise the melting point of the $Li_2O-P_2O_5$ system. Again runs 3-1 to 3-4 impregnations used the melt technique described in Example 1 except that the melt was heated to 900–1000° C. before impregnation. The first charged $LiH_2PO_4$ to the melter followed by the graphite. The second charged a 2 to 1 weight ratio of $LiH_2PO_4$ and $MgH_4P_2O_8 \cdot 2H_2O$ (or $MgH_4(PO_4)_2 \cdot 2H_2O$) to the melter followed by the graphite. The third used a 1 to 1.45 weight ratio of these same chemicals and the last a 1 to 2 ratio.

It is believed that the effectiveness of the $Li_2O-MgO-P_2O_5$ ceramic as an oxidation inhibitor stems in part from the fact MgO is a weak base. This tends to increase the partial pressure of $P_2O_5$ generated, and $P_2O_5$ is known to be a very effective inhibitor for the $C-O_2$ reaction. Another factor that helps is the apparent superior wetting of the graphite by this melt system. The lower oxidation resistance at higher MgO to $Li_2O$ ratios of Runs 3-3 and 3-4 may be inherent in the melt compositions or may be due to a poorer impregnation job caused by higher, more difficult-to-attain melting points. Nevertheless, it is seen that the melt impregnated graphites are superior to the solution impregnated graphites of Example 1, above.

EXAMPLE 4

| Run No. | Impregnant Mol Ratio | | | Shaped Graphite | | Impregnation | | Hrs. to 5% Wt. Loss in Air at 677° C. |
|---|---|---|---|---|---|---|---|---|
| | MgO | $Li_2O$ | $P_2O_5$ | Type | A.D. | Content, Percent | Voids Filled, Percent [a] | |
| 4-1 | 0.277 | 0.723 | 1.000 | GPCBC | 1.85 | 5.18 | 44 | 52.6 |
| 4-2 | 0.277 | 0.723 | 1.000 | GPCBC | 1.83 | 6.30 | 48 | 72.0 |
| 4-3 | 0.277 | 0.723 | 1.000 | GPCBC | 1.87 | 5.10 | 50 | 108.0 |
| 4-4 | 0.277 | 0.723 | 1.000 | GPCBC | 1.82 | 8.20 | 62 | 400.2 |
| 4-5 | 0.277 | 0.723 | 1.000 | GPCBC | 1.82 | 8.40 | 63 | 789.0 |
| 4-6 | 0.277 | 0.723 | 1.000 | GPCBC | 1.88 | 6.55 | 69 | 499.0 |
| 4-7 | 0.277 | 0.723 | 1.000 | GPCBC | 1.83 | 8.90 | 70 | [b] 462 |
| 4-8 | 0.277 | 0.723 | 1.000 | GPCBC | 1.87 | 7.43 | 73 | [c] 1,030 |
| 4-9 | Control (3 cubes) | | | GPCBC | | None | | 0.8–1.4 |

[a] Assumes graphite skeleton density of 2.038 gm./cc. and a ceramic density of 2.5 gm./cc.
[b] Based on 188.9 hr. test.
[c] Based on 1,005.3 hr. test.

All the above graphites were impregnated from melts of mixtures of magnesium and lithium phosphates (i.e. $MgH_4P_2O_8 \cdot 2H_2O$ and $LiH_2PO_4$) as described in Example 1.

In general, it is seen that increasing the fraction of the voids filled increased the oxidation resistance. Some of the scatter in the data was undoubtedly caused by variations in skeleton density of the graphites which has been assumed constant at 2.038 gm./cc. It is known that this value does vary slightly from lot to lot depending on raw materials and process conditions. Another factor causing scatter is believed to be the variation in the degree to which the melt wetted the sample which may be due to some variation in melt temperature during impregnation. These impregnated graphites are thus very useful as oxidation resistant materials for use at temperatures below about 675° C.

As in the case of Example 1, filling the pores with this ceramic increased the strength.

| Run No. | Material | A.D., gm./cc. | Scleroscope Hardness | Flexual Str., p.s.i. | |
|---|---|---|---|---|---|
| | | | | Average | Range |
| 4-9 | GPCBC non impreg. control a | 1.80-1.83 | 76-82 | 7,800 | 7,430-8,520 |
| 4-6 | GPCBC impregnated this melt | 1.96-1.98 | 84-90 | 11,280 | 10,460-12,100 | a Range and average for 5 pieces.

A 24 hour extraction (Soxhlet) with water was conducted on some of the melt impregnated graphites:

| Run No. | Material | Before Extraction | | After Extraction | Fraction Impregnant Lost |
|---|---|---|---|---|---|
| | | A.D. | Content, Percent | Content, Percent | |
| 4-10 | Graphite impregnated similar to Run 4-6. | 1.99 | 6.34 | 4.02 | .37 |
| 4-11 | ___do___ | 2.01 | 6.36 | 4.35 | .32 |

The Soxhlet data demonstrate the low solubility of the impregnant in water; a solubility of this level is acceptable for many uses.

EXAMPLE 5

| Run No. | Impregnant Mol Ratio | | | Shaped Graphite | | Content, Percent | Voids Filled, Percent a | Hrs. to 5% Wt. Loss in Air at 677° C. |
|---|---|---|---|---|---|---|---|---|
| | MgO | Li$_2$O | P$_2$O$_5$ | Type | A.D. | | | |
| 5-1 | 0.606 | 0.394 | 1.000 | GPCBC | 1.82 | 9.27 | 70 | 89.6 |
| 5-2 | 0.606 | 0.394 | 1.000 | GPCBC | 1.81 | 10.4 | 75 | 115.4 | a Assumes graphite skeleton density of 2.038 gm./cc. and a ceramic density of 2.5 gm./cc.

This series parallels that of Example 4 except that a different Li$_2$O-MgO-P$_2$O$_5$ ratio was used. The melt was made from a mixture of LiH$_2$PO$_4$ and MgH$_4$P$_2$O$_8$·2H$_2$O (1 to 2 ratio). The graphites were charged to the melt and impregnated according to the method of Example 1, above. This example also shows that oxidation resistance increases as fraction of voids filled increases.

EXAMPLE 6

| Run No. | Impregnant Mol Ratio | | | | Shaped Graphite | | Impregnation | | Hrs. to 5% Wt. Loss in Air at 677° C. |
|---|---|---|---|---|---|---|---|---|---|
| | Na$_2$O | Li$_2$O | CaO | P$_2$O$_5$ | Type | A.D. | Content, Percent | Voids Filled | |
| 6-1 | 0.695 | 0.766 | | 1.000 | GPCBC | 1.86 | 5.97 | a 55 | 2.8 |
| 6-2 | | | 1.000 | 1.000 | GPCBC | 1.86 | 6.38 | b 50 | 28.2 |
| 6-3 | | | 1.000 | 1.000 | GPCBC | 1.86 | 5.73 | b 45 | 21.8 |
| 6-4 | | | 1.000 | 1.000 | GPCBC | 1.87 | 6.81 | b 60 | 22.9 |
| 6-5 | | 0.219 | 0.781 | 1.000 | GPCBC | 1.82 | 8.68 | c 60 | 38.9 |
| 6-6 | | 0.219 | 0.781 | 1.000 | NGC | 1.73 | 6.22 | | 0.4 |
| 6-7 | Control | | | | GPCBC | | 0 | | 1.4 | a Assumes spec. gr. of Na$_2$O-Li$_2$O-P$_2$O$_5$ ceramic=2.5.
b Assumes spec. gr. of CaO-P$_2$O$_5$ ceramic=2.8.
c Assumes spec. gr. of CaO-Li$_2$O-P$_2$O$_5$ ceramic=2.8.
NGC—non-graphitized carbon.

All tests in this example used the melt technique described in Example 1, above. Run 6-1 used a melt from mixture of LiH$_2$PO$_4$ and Na$_3$PO$_4$·12H$_2$O in a 1:1 ratio. Runs 6-2 and 6-3 used a melt from CaH$_4$P$_2$O$_8$. Run 6-4 used a melt made from CaH$_4$P$_2$O$_8$·H$_2$O. Runs 6-5 and 6-6 used a melt made from a mixture of 1 part of LiH$_2$PO$_4$ and 4 parts of CaH$_4$P$_2$O$_8$.

Test results on Run 6-1, the Na$_2$O-Li$_2$O-P$_2$O$_5$ system, may be due to the high ratio of alkali metal to P$_2$O$_5$ which would tend to suppress P$_2$O$_5$ evolution and hence give lesser oxidation inhibition. In Runs 6-2 to 6-4, the CaO-P$_2$O$_5$ system, since calcium is more alkaline than magnesium, it is a poorer donor of P$_2$O$_5$. Also, the fraction of voids filled are lower than is desired. In Run 6-5, the CaO-Li$_2$O-P$_2$O$_5$ system, dilution of the CaO with Li$_2$O appeared to help oxidation resistance.

When a non-graphitized base (Run 6-6) is substituted for the graphitized bases, lower oxidation resistance values are observed. The base in this case contains over 5% ash and has a much poorer oxidation resistance than the graphitized bases. On a percentage basis there is nearly as much improvement in the oxidation resistance of the non-graphitized base as there is in that of the graphitized bases.

While the use of Ca and Na phosphates is less effective as shown by this example, the results obtained are in most cases better than those shown by solution impregnated graphites. Also, this example shows the desirability of keeping the metal oxide-P$_2$O$_5$ mol ratio close to 1:1 in most cases and of filling a major amount of the voids in the graphite article.

EXAMPLE 7

| Run No. | Impregnant Mol Ratio | | Shaped Graphite | | Impregnation | | Hrs. to 5% Wt. Loss in Air at 677° C. |
|---|---|---|---|---|---|---|---|
| | ZnO | $P_2O_5$ | Type | A.D. | Content, Percent | Voids Filled, Percent | |
| 7-1 (1) | 3.000 | 1.000 | GPCBC | 1.88 | 4.3 | 25 | 3.5 |
| 7-2 (1) | 3.000 | 1.000 | GPCBC | 1.89 | 5.2 | 35 | 10.4 |
| 7-3 (1) | 3.000 | 1.000 | GPCBC | 1.86 | 12.7 | 50 | 10.8 |
| 7-4 (1) | 3.000 | 1.000 | GPCBC | 1.87 | 10.3 | 65 | 8.8 |
| Control | | | GPCBC | 1.85 | None | | 0.8 |

For certain applications the impregnant must have very low solubility (salts not soluble in $H_2O$). Trizinc ortho phosphate, $Zn_3P_2O_8$, meets these requirements, and, zinc being a weakly alkaline metal, liberates $P_2O_5$ slowly. These data show it is beneficial though not as effective as the $Li_2O$-$MgO$-$P_2O_5$ ceramic. The graphites were impregnated according to the method of Example 1, above, using a melt prepared from $Zn_3P_2O_8$.

EXAMPLE 8

| Run No. | Impregnant Mol Ratio | | | Shaped Graphite | | Impregnation | | Hrs. to 5% Wt. Loss in Air at 677° C. |
|---|---|---|---|---|---|---|---|---|
| | ZnO | $Li_2O$ | $P_2O_5$ | Type | A.D. | Content, Percent | Voids Filled, Percent | |
| 8-1 | 0.583 | 0.417 | 1.000 | GPCBC | 1.89 | 8.4 | a 80 | 43.3 | a Assumes $Li_2O$-$ZnO$-$P_2O_5$ spec. gr.=3.00.

The method of this example was similar to that of Example 1, above. A mixture, 2 to 1 weight ratio, of zinc metaphosphate ($ZnP_2O_6$) and $LiH_2PO_4$ was charged to the melter followed by the graphite. This melt may have been overheated and some of the $P_2O_5$ driven off. If this did occur, the $P_2O_5$/metal oxide ratio would be below 1.00, and this generally adversely affects performance of inhibitor systems.

EXAMPLE 9

Other graphites were impregnated according to the method of Example 1, above, using a ceramic melt prepared from a mixture of $LiH_2PO_4$ and $$MgH_4(PO_4)_2 \cdot 2H_2O$$

(2 to 1 weight ratio). The data are shown below:

| Run No. | Impregnant Mol Ratio | | | Shaped Graphite | | Impregnation, Percent | | Hrs. to 5% Wt. Loss in Air at 677° C. |
|---|---|---|---|---|---|---|---|---|
| | MgO | $Li_2O$ | $P_2O_5$ | Type | A.D. | Content | Voids Filled | |
| 9-1 | 0.277 | 0.723 | 1.000 | (A) | 1.65 | 14.0 | 45 | 1.5 |
| 9-2 | 0.277 | 0.723 | 1.000 | (B) | 1.72 | 6.3 | 30 | 12.8 |
| 9-3 | 0.277 | 0.723 | 1.000 | (C) | 1.51 | 16.7 | 35 | 65.6 |
| 9-4 | 0.277 | 0.723 | 1.000 | (D) | 1.66 | 11.4 | 45 | 22.4 |
| 9-5 | 0.277 | 0.723 | 1.000 | (E) | 1.66 | 11.0 | 45 | 15.4 |
| 9-6 | 0.277 | 0.723 | 1.000 | (F) | 1.82 | 8.2 | 62 | 400.2 |

(A)—Graphitized lamp black base carbon.
(B)—Commercially available graphite.
(C)—Graphitized scrap (artificial) graphite base.
(D)—Graphitized natural graphite coke base carbon.
(E)—Graphitized scrap (artificial) graphite base.
(F)—Graphitized petroleum coke base carbon (GPCBC).

These results show that other graphites can be improved in oxidation resistance by the melt impregnation techniques of this invention. Although the oxidation resistance in some instances is not as good as desired due to the fact that the fraction of voids filled was not high, the results obtained are still on the average better than those obtained with solution impregnated phosphates. Run 9-6 shows that where the fraction of voids filled with impregnant got above 60% there was a sharp increase in oxidation resistance.

The oxidation tests set forth in these examples are described as follows. The test specimen was a ¾ inch cube of carbon. It was suspended from the pan of an analytical balance using a 25–30 inch length of wire. When thus suspended, the cube is centered in a vertical tube furnace whose temperature is controlled to about ±3° C. by automatic equipment. The temperature sensing element is in the gas stream about ¼ inch below the test cube. Special experiments wherein a second thermocouple was inside the test cube showed the cube itself was within 5.5° C. of the above mentioned temperature sensing element. Air for oxidation of the carbon is taken from a compressor, dried over activated alumina gel (to −40° C. dewpoint or less), and metered into the bottom of the furnace tube. The lower ⅓ of this heated tube is filled with porcelain chips to aid in preheating the air to carbon temperature. Air flow is controlled to maintain a velocity of 4 ft./min., measured at furnace temperature, past the carbon or graphite sample. Calculations show the oxygen content of this air is sufficient to gasify (to $CO_2$) over 35% of the sample in an hour. Since in actual practice a test temperature is selected at which the carbon gasification rate is below 15% per hour, there is always a large excess of oxygen available (at the temperatures used, and the probable product is CO, not $CO_2$, so this excess is even larger than might first appear). The oxidation rates contain a residual variation which cannot be readily removed. For convenience in use, oxidation resistance is expressed as hours required to get a 5% weight loss. It will be appreciated that the quality of graphites varies from batch to batch and that the process of the present invention is effective regardless of the quality of the graphite with which one starts. In the case of the best untreated carbon (graphite), it typically takes 25 hours at 537.8° C. in air to burn off 5%. Poorer grades of graphite burn off in air at 537.8° C. considerably faster than do the better grades. Adjacent cubes (many) cut from a single plate of this graphite will typically range from 15–40 hours to 5% burn off. In mathematical terms, the standard deviation of this test method is ±30% of the average value. This deviation is probably due to irreducible variations in the material, or in undetectable variations in the way the apparatus operates. The practical result is that many tests are required to "verify" small improvements in oxidation resistance while even a single test suffices for improvements larger than twofold.

EXAMPLE 10

| Run No. | Impregnant [a] Mol Ratios | | | Process Used | Impregnation, Percent | | Oxid. Resist., Hrs. [b] |
|---|---|---|---|---|---|---|---|
| | MgO | Li$_2$O | P$_2$O$_5$ | | Content | Voids Filled | |
| 10-1 | 0.277 | 0.723 | 1.000 | Sol'n | 1.56 | 13 | 7.9 |
| 10-2 | 0.277 | 0.723 | 1.000 | Sol'n | 3.49 | 28 | 11.6 |
| 10-3 | 0.277 | 0.723 | 1.000 | Melt | 9.44 | 78 | 1,160 |
| 10-4 | None (control) | | | | | | 1.1 |

[a] The graphite body used was GPCBC.
[b] Hours to 5% wt. loss in air at 677° C.

This example is similar to Example 1 above except that a mixed phosphate of lithium and magnesium as shown in Example 3 was used. Use of the melt technique gave a 3-fold increase in impregnant level and a 100-fold increase in oxidation resistance over solution impregnation.

EXAMPLE 11

| Run No. | Melt Impregnant Ingredients, [a] Weight Percent | | | | Content, Percent | Oxid. Resist., Hrs. [b] |
|---|---|---|---|---|---|---|
| | Li$_2$B$_4$O$_7$·H$_2$O | MgH$_4$P$_2$O$_8$·2H$_2$O | LiH$_2$PO$_4$ | 3ZnO·2B$_2$O$_3$ | | |
| 11-1 | 83.4 | 16.6 | | | 8.05 | 30.5 |
| 11-2 | 90.9 | | 9.1 | | 8.05 | 8.4 |
| 11-3 | | | | 100 | 7.89 | 1.0 |
| 11-4 | 100 | | | | 6.02 | 0.9 |
| 11-5 | None (control) | | | | 0 | 0.9–1.4 |

[a] The graphite body used was GPCBC.
[b] Hours to 5% weight loss in air at 677° C.

The graphites were melt impregnated according to the general process of Example 1, above. Under some circumstances it is desirable to use borates to alter the viscosity of the melt. This series of runs shows that even in high concentration two typical borates did not adversely affect the inhibiting influence of phosphates. The borates themselves are apparently inactive.

EXAMPLE 12

The graphite bodies were melt impregnated generally according to the melt technique of Example 1, above. These data supplement the data of Examples 3, 5 and 9. They show that Li$_2$O and MgO are interchangeable over a wide range. Maximum oxidation resistance appears to be obtained when the Li$_2$O to MgO ratio nears 2 to 1 although the use of MgO raises the melting point of the ceramic making it more difficult to get a thorough impregnation as shown.

The second thing these data disclose is the utility of this system in three widely different artificial graphites. The oxidation resistance of all 3 is improved at least 1000-fold by this process.

(F) Graphitized (calcined) petroleum coke base carbon.
(A) Graphitized lamp black base carbon.
(E) Graphitized scrap (artificial) graphite base.

It is to be understood that in accordance with the provisions of the patent statute the particular products and methods shown and described herein are presented for purposes of explanation and illustration and that various modifications of said methods and products can be made without departing from the spirit of this invention.

What is claimed is:
1. The method for improving the oxidation resistance of a porous carbon body which comprises impregnating said body with a fluid molten composition of an inorganic phosphate at a pressure of from about 125 to 500 atmospheres at a temperature of from about 400 to 1500° C. to fill a substantial amount of the open cells of said body with said composition, said phosphate having a M$_x$O$_y$ to P$_2$O$_5$ mol ratio of from about 4:1 to 1:4, where M is a cation, $x$ is the number of atoms of M and $y$ is the number of atoms of O.

2. The method for improving the oxidation resistance of a shaped porous graphitized carbon body which comprises impregnating said body with a fluid melt of an inorganic phosphate composition at a pressure of from about 125 to 500 atmospheres and at a temperature of

EXAMPLE 12

| Run No. | Graphite Body | | Impregnant, Mol, Ratio | | | Impregnation, (percent | | Oxid.[a] Resist., Hrs. |
|---|---|---|---|---|---|---|---|---|
| | Type | A.D. | MgO | Li$_2$O | P$_2$O$_5$ | Content | Voids Filled | |
| 12-1 | (F) | 1.83 | .277 | .723 | 1.000 | 9.44 | 76 | 1,160 |
| 12-2 | (F) | 1.81 | .352 | .648 | 1.000 | 8.71 | 68 | 1,733 |
| 12-3 | (F) | 1.82 | .400 | .600 | 1.000 | 8.24 | 67 | 912 |
| 12-4 | (F) | 1.82 | .450 | .550 | 1.000 | 8.80 | 77 | 405 |
| 12-5 | (F) | 1.82 | 1.000 | 0 | 1.000 | 4.3 | 34 | 3 |
| 12-6 | (F) | 1.81 | None (control) | | | | | 1.1 |
| 12-7 | (A) | 1.66 | .277 | .723 | 1.000 | 14.1 | 59 | 766 |
| 12-8 | (A) | 1.66 | .352 | .648 | 1.000 | 15.3 | 65 | 3,980 |
| 12-9 | (A) | 1.66 | .400 | .600 | 1.000 | 14.2 | 59 | 2,290 |
| 12-10 | (A) | 1.66 | .450 | .550 | 1.000 | 13.4 | 55 | 1,121 |
| 12-11 | (A) | 1.66 | 1.000 | 0 | 1.000 | 8.03 | 31 | 5.5 |
| 12-12 | (A) | 1.66 | None (control) | | | | | 0.9 |
| 12-13 | (E) | 1.59 | .352 | .648 | 1.000 | 16.1 | 57 | 912 |
| 12-14 | (E) | 1.59 | .400 | .600 | 1.000 | 15.9 | 57 | 508 |
| 12-15 | (E) | 1.60 | .450 | .550 | 1.000 | 15.2 | 54 | 32 |
| 12-16 | (E) | 1.60 | 1.000 | 0 | 1.000 | 9.4 | 31 | 3.5 |
| 12-17 | (E) | 1.65 | None (control) | | | | | 0.8 |

[a] Hours to 5% weight loss in air at 677° C.

from about 400 to 1500° C. to fill at least about 55% of the open cells of said graphite with said melt, said phosphate composition having a $M_xO_y$ to $P_2O_5$ mol ratio of from about 4:1 to 1:4 where M is a cation, $x$ is the number of atoms of M and $y$ is the number of atoms of O.

3. The method according to claim 2 where the $M_xO_y$ to $P_2O_5$ mol ratio is from about 0.3:1 to 0.6:1.

4. The method according to claim 2 where the $M_xO_y$ to $P_2O_5$ mol ratio is about 1:1.

5. The method according to claim 4 where $M_xO_y$ is $Li_2O$.

6. The method according to claim 4 where $M_xO_y$ is a mixture of MgO and $Li_2O$.

7. The method according to claim 4 where $M_xO_y$ is a mixture of $Li_2O$ and CaO.

8. The method according to claim 4 where $M_xO_y$ is ZnO.

9. The method according to claim 4 where $M_xO_y$ is a mixture of ZnO and $Li_2O$.

10. The method according to claim 4 where $M_xO_y$ is a mixture of MgO and $Li_2O$ and where the mol ratio of MgO to $Li_2O$ is from about 0.2:0.8 to 0.5:0.5.

11. The method according to claim 2 where said melt contains additionally from about ½ to 7 moles of an inorganic diluent selected from the group consisting of a metallic borate and a metallic silicate, and mixtures thereof, per mole of said phosphate composition.

12. In a process for improving the oxidation resistance of a shaped graphitized carbon body wherein the open cells of said body are partially filled under pressure with a refractory inorganic phosphorus-oxygen salt which decomposes to release phosporus oxide at high temperature, the improvement which comprises: heating said salt to a temperature between 400° C. and 1500° C. and above its melting point without decomposing said salt to form a fluid molten ceramic composition with a viscosity from about 50 to 1000 centipoises, covering said graphitized carbon body with said molten ceramic composition, and applying a pressure from about 125 to 500 atmospheres for a period of time sufficient to fill at least 55 percent of the open cells of said body with said molten ceramic composition and to impregnate said body throughout.

13. A carbon body exhibiting improved resistance to oxidation in which a substantial amount of the open cells of said body have been filled with a molten composition of an inorganic phosphate having a $M_xO_y$ to $P_2O_5$ mol ratio of from about 4:1 to 1:4, where M is a cation, $x$ is the number of atoms of M and $y$ is the number of atoms of O.

14. An article according to claim 13 where said carbon body is a shaped graphite.

15. A shaped porous graphite exhibiting improved resistance to oxidation in which at least about 55% of the open cells of said graphite have been filled with a fused product of an inorganic phosphate composition having a $M_xO_y$ to $P_2O_5$ mol ratio of from about 4:1 to 1:4 where M is a cation, $x$ is the number of atoms of M and $y$ is the number of atoms of O.

16. A shaped porous graphite according to claim 15 where the $M_xO_y$ to $P_2O_5$ mol ratio is from about 0.3:1 to 0:6:1.

17. A shaped porous graphite according to claim 15 where the $M_xO_y$ to $P_2O_5$ mol ratio is about 1:1.

18. A shaped porous graphite according to claim 17 where $M_xO_y$ is $Li_2O$.

19. A shaped porous graphite according to claim 17 where $M_xO_y$ is a mixture of MgO and $Li_2O$.

20. A shaped porous graphite according to claim 19 where the mol ratio of MgO to $Li_2O$ is from about 0.2:0.8 to 0.5:0.5.

21. A shaped porous graphite according to claim 17 where $M_xO_y$ is a mixture of $Li_2O$ and CaO.

22. A shaped porous graphite according to claim 17 where $M_xO_y$ is ZnO.

23. A shaped porous graphite according to claim 15 where said fused product contains additionally from about ½ to 7 mols of an inorganic diluent selected from the group consisting of metallic borates and metallic silicates, and mixtures thereof, per mol of said phosphate composition.

References Cited
UNITED STATES PATENTS

| | | | |
|---|---|---|---|
| 2,626,871 | 1/1953 | Zinszer | 106—56 |
| 2,685,539 | 8/1954 | Woodburn et al. | 117—113 X |
| 2,685,540 | 8/1954 | Woodburn et al. | 117—228 X |
| 2,685,541 | 8/1954 | Woodburn et al. | 117—228 X |
| 2,685,542 | 8/1954 | Woodburn et al. | 117—113 X |
| 2,868,672 | 1/1959 | Johnson et al. | 106—56 X |
| 2,906,632 | 9/1959 | Nickerson | 106—56 |
| 2,937,101 | 5/1960 | Nelson et al. | 106—56 X |
| 3,029,167 | 4/1962 | Carlson et al. | 117—228 |
| 3,206,327 | 9/1965 | Diefendorf | 117—121 |

ALFRED L. LEAVITT, *Primary Examiner.*

E. B. LIPSCOMB, *Assistant Examiner.*